United States Patent
Yonetani (10) Patent No.: US 7,646,542 B2
(45) Date of Patent: *Jan. 12, 2010

(54) MICROSCOPE OBJECTIVE LENS

(75) Inventor: Atsushi Yonetani, Ina (JP)

(73) Assignee: Olympus Corporation, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 12/019,016

(22) Filed: Jan. 24, 2008

(65) Prior Publication Data

US 2008/0212199 A1     Sep. 4, 2008

(30) Foreign Application Priority Data

Jan. 31, 2007     (JP)     ............... 2007-021643

(51) Int. Cl.
*G02B 21/02*     (2006.01)
*G02B 27/64*     (2006.01)
*G02B 9/12*     (2006.01)

(52) U.S. Cl. .............. 359/661; 359/784; 359/791; 359/792; 359/557

(58) Field of Classification Search ......... 359/656–661, 359/754–757, 759–760, 763–764, 767–769, 359/771–772, 780, 784, 791–792; G02B 21/02
See application file for complete search history.

(56) References Cited

U.S. PATENT DOCUMENTS 5,532,878 A  *  7/1996  Suenaga et al. ............. 359/657

| | | |
|---|---|---|
| 6,501,603 B2 | 12/2002 | Kasahara |
| 2002/0027707 A1 | 3/2002 | Ono |
| 2004/0105164 A1 | 6/2004 | Miyashita |
| 2005/0207021 A1 | 9/2005 | Yamaguchi |

FOREIGN PATENT DOCUMENTS

| | | |
|---|---|---|
| EP | 1 746 448 A | 1/2007 |
| JP | 59 100 409 A | 6/1984 |
| JP | H3-58492 | 9/1991 |
| JP | 08 248 321 A | 9/1996 |
| JP | 09 089 753 A | 4/1997 |
| JP | 3371934 | 11/2002 |
| JP | 2005-189732 | 7/2005 |

* cited by examiner

*Primary Examiner*—Darryl J Collins
*Assistant Examiner*—Zachary Wilkes
(74) *Attorney, Agent, or Firm*—Arnold International; Bruce Y. Arnold (57) ABSTRACT

A microscope objective lens is disclosed that includes, in order from the object side, a first lens group having positive refractive power, a second lens group having positive refractive power that is movable along the optical axis, and a third lens group. The first lens group includes, in order from the object side, two meniscus lens components, each with its concave surface on the object side, and at least one positive lens component, and the third lens group has adjacent concave lens element surfaces that face each other and are in contact with air. Specified conditions may be satisfied, and one or more lens components in the first lens group and the second lens group may be movable.

10 Claims, 5 Drawing Sheets

MICROSCOPE OBJECTIVE LENS

This application claims the benefit of foreign priority under 35 U.S.C. §119 of JP 2007-021,643 filed Jan. 31, 2007, the disclosure of which is hereby incorporated by reference.

BACKGROUND OF THE INVENTION

At present, in cutting edge research fields, for the purpose of identification of vital functions or behavioral analysis/ interaction of proteins, various techniques have been developed to observe living cells over a period from a few days to several weeks. As a microscope observation technique for observing lesions within living cells, wide use has been made of a fluorescence observation technique. In this fluorescence observation technique, after biological samples (e.g., living cells) have been dyed using a fluorescent material such as a specific fluorescent protein as a luminescent marker, excitation light is irradiated onto the biological samples so that fluorescence is generated. The presence and locations of specific sites within the biological samples, such as lesions, are then detected by observing the sample.

An objective lens of a biological microscope is generally configured to observe an object under observation (i.e., a specimen) through a cover glass. It is assumed that the thickness of the cover glass is a constant standard value, and the aberrations that are generated by the cover glass are designed to be favorably corrected by the objective lens. However, production flaws are inherent in making cover glasses. Further, depending upon the particular observation technique used, there are occasions during which an object under observation is observed through a flat plate having surfaces that are roughly parallel, such as a cover glass or a petri dish, but with the thickness of the flat plate being different from the standard value for which the objective lens was designed.

Consequently, when the thickness of a cover glass is different from the standard value, when the thickness fluctuates due to manufacturing tolerances, or when a combination of these two conditions occurs, the aberrations generated by the cover glass will not be sufficiently corrected by the objective lens, and thus the image quality deteriorates. More specifically, the higher the numerical aperture (hereinafter NA) of the objective lens of the microscope, the more apparent the deterioration of image quality becomes.

Japanese Laid Open Patent Application H03-58492 and Japanese Publication 3371934 disclose conventional microscope objective lenses wherein aberrations generated by a cover glass, that is arranged between the plane of an object under observation and the objective lens, are corrected either for the cover glass being of a non-standard thickness or for having a thickness that fluctuates due to manufacturing tolerances.

BRIEF SUMMARY OF THE INVENTION

The present invention relates to a microscope objective lens that has a high NA wherein it is possible to acquire with a high signal-to-noise ratio a weak luminescence signal, while also having a wide field of view and the capability to correct for aberrations caused by the cover glass having a different thickness than a thickness value for which the objective lens was designed.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

In fluorescence observations, if some type of excitation (such as irradiation using an excitation light) is applied to a biological sample, there is a possibility that the excitation may adversely affect an activation state of the cells. Consequently there is high demand for a microscope system wherein a luminescent marker may be excited by using, to the extent possible, an excitation light having a weak intensity, and wherein a weak luminescence signal, which is generated in response to the excitation, can be detected with an extremely high efficiency.

Further, there is also high demand for a microscope system wherein a loss of sight due to the movement of living cells out of the observation field can be prevented by providing a microscope system that enables simultaneously observing, over a wide field of view, information from many cells that is detected at once. In addition, there is the usual demand for high processing speed and improvements in operational efficiency. However, no microscope device or system that is currently available satisfies these requirements.

The objective lenses described in Japanese Laid Open Patent Application H03-58492 and in Japanese Patent Publication 3371934 are not suitable for use in a microscope device or system that satisfies these requirements. The applicant of the present application has previously proposed, in Japanese Patent Application No. 2005-188086, a microscope objective lens that does satisfy these requirements (i.e., one that has a high NA, thus enabling the acquisition of a weak luminescence signal with high signal-to-noise ratio S/N) as well as a microscope system that is equipped with such a microscope objective lens. However, the microscope objective lens disclosed in Japanese Patent Application No. 2005-188086 does not provide for any way to correct for aberrations associated with a fluctuation in cover glass thickness due to manufacturing tolerances or for using a different thickness of cover glass than that for which the microscope objective lens was designed. Further, in biological microscope observations, not only any change in the cover glass thickness, but also any change in ambient temperature (e.g., using a microscope at elevated ambient temperatures to promote cell culturing) will cause a variation in aberrations. Thus, there is a need to have the microscope objective lens disclosed in Japanese Patent Application No. 2005-188086 be capable of correcting for a variation in aberrations caused by both cover glass thickness variations and ambient temperature variations.

The object of the present invention is to provide a microscope objective lens that has a high NA for enabling the acquisition of a weak signal with a high S/N, while maintaining excellent correction of various aberrations and providing a wide observation field of view such that the microscope objective lens maintains compatibility with a conventional microscope system.

The term "lens element" is herein defined as a single transparent mass of refractive material having two opposed refracting surfaces, which surfaces are positioned at least generally transversely of the optical axis of the microscope objective lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The microscope objective lens of the present invention includes, in order from the object side, a first lens group having positive refractive power, a second lens group having positive refractive power that is movable along the optical axis (as shown by the double-headed arrow), and a third lens group. The first lens group includes, in order from the object side, two meniscus lens components, each with its concave surface on the object side, and at least one positive lens component, and the third lens group has adjacent concave lens element surfaces that face each other and are in contact with air.

Further, it is preferable that the microscope objective lens of the present invention satisfies the following conditions:

$$7 \leq f \qquad \text{Condition (1)}$$

$$0.5 < NA \qquad \text{Condition (2)}$$

where f is the focal length (in mm) of the objective lens, and

NA is the numerical aperture of the objective lens on its object side.

In the microscope objective lens of the present invention, it is preferable that the movement of the second lens group be for correction of aberrations associated with having a non-standard thickness of a roughly plane-parallel plate that may be positioned between an object under observation and the first lens group. The non-standard thickness may result from manufacturing tolerances or from using a plane-parallel plate of a uniform but non-standard thickness, or both.

Still further, in the microscope objective lens of the present invention, it is preferable that the second lens group satisfies the following condition:

$$0.8 \leq |\beta 2| \leq 1.2 \qquad \text{Condition (3)}$$

where

β2 is the lateral magnification of the second lens group when the object of the second lens group is the image formed by the first lens group.

In the microscope objective lens of the present invention, it is preferable that a positive lens component, which is located on the image side of the two meniscus lens components in the first lens group, is movable along the optical axis so as to enable aberrations caused by a change in ambient temperature of the objective lens to be corrected.

Moreover, it is preferable that the microscope objective lens of the present invention satisfies the following condition:

$$60 < D \leq 120 \qquad \text{Condition (4)}$$

where

D is the on-axis distance (in mm) measured from the object under observation to a mounting plane S, with the mounting plane S being a plane where the objective lens is mounted to a microscope body.

By requiring the first lens group to include two meniscus lens components, each with a concave surface on the object side and arranged sequentially along the optical axis, the ray height can be gradually increased without using excessive refractive power. By requiring the second lens group to have positive refractive power, the ray height does not have to increase more than is necessary, so the generation of aberrations can be minimized. By requiring the third lens group to have two lens components with adjacent facing concave surfaces that contact air, the Petzval sum can be made small. Furthermore, from the point of view of reducing the number of lens elements and simplifying the lens element configuration, it is desirable that there be a single pair of lens components having adjacent facing concave surfaces that contact air.

By ensuring that Conditions (1) and (2) above are satisfied, an objective lens may be provided that is suitable for use in the microscope device and the microscope system disclosed in Japanese Patent Application 2005-188086. Thus, an objective lens may be provided that has a high NA and a broad field of view while maintaining compatibility with a conventional microscope system.

Further, in the microscope objective lens of the present invention, preferably the movement of the second lens group along the optical axis is for correction of aberration variations associated with a non-standard thickness of a roughly-parallel flat plate that may be arranged between an object under observation and the first lens group. With this configuration, an objective lens having a broad field of view and a high NA that simultaneously enables correction of aberration variations associated with a non-standard thickness of a roughly-parallel flat plate that may be arranged between an object under observation and the first lens group is provided.

When Condition (3) above is satisfied, even if the cover glass thickness varies, if a cover glass of a different thickness is used, or both, the fluctuation of the image point position can be controlled as much as possible, and an objective lens having a broad field of view and a high NA wherein aberration corrections are improved can be provided.

In order to reduce a fluctuation of the image point position when the second lens group is moved, it is necessary to reduce the refractive power of the second lens group. For example, if the second lens group were to be formed of only a plane-parallel glass plate, the image point would not move along the optical axis when the second lens group is moved along the optical axis. In this case, the refractive power of the second lens group would be zero and the magnification of the second lens group for an object at infinity would be 1. If the second lens group for correcting the aberrations with respect to paraxial rays functions substantially the same as plane-parallel glass plates, the movement of the image point will be minimal. Therefore, for the purpose of reducing the movement of the image point as much as possible when the second lens group is moved along the optical axis, it is necessary that the refractive power of the second lens group be reduced as much as possible. Moreover, the magnification of the second lens group should be near unity.

If Condition (3) above is not satisfied, the movement of the image point becomes greater and adequately correcting the various aberrations becomes difficult.

Further, in the microscope objective lens of the present invention, it is preferable that a positive lens component in the first lens group, which is on the image side of the two meniscus lens components in the first lens group, is movable along the optical axis so as to enable the correction of aberration variations associated with a change in temperature of the microscope objective lens, as when the ambient temperature is increased above normal room temperature to promote cell culturing.

If the lower limit of Condition (4) is not satisfied, there will be insufficient space for providing a sufficient number of lens elements to adequately correct various aberrations. On the other hand, if the upper limit value of Condition (4) is not satisfied, the overall size of the objective lens will become too large, thereby making miniaturization of the overall microscope system difficult.

Two embodiments of the invention will now be described in detail with reference to the drawings.

Embodiment 1

Figure 1:
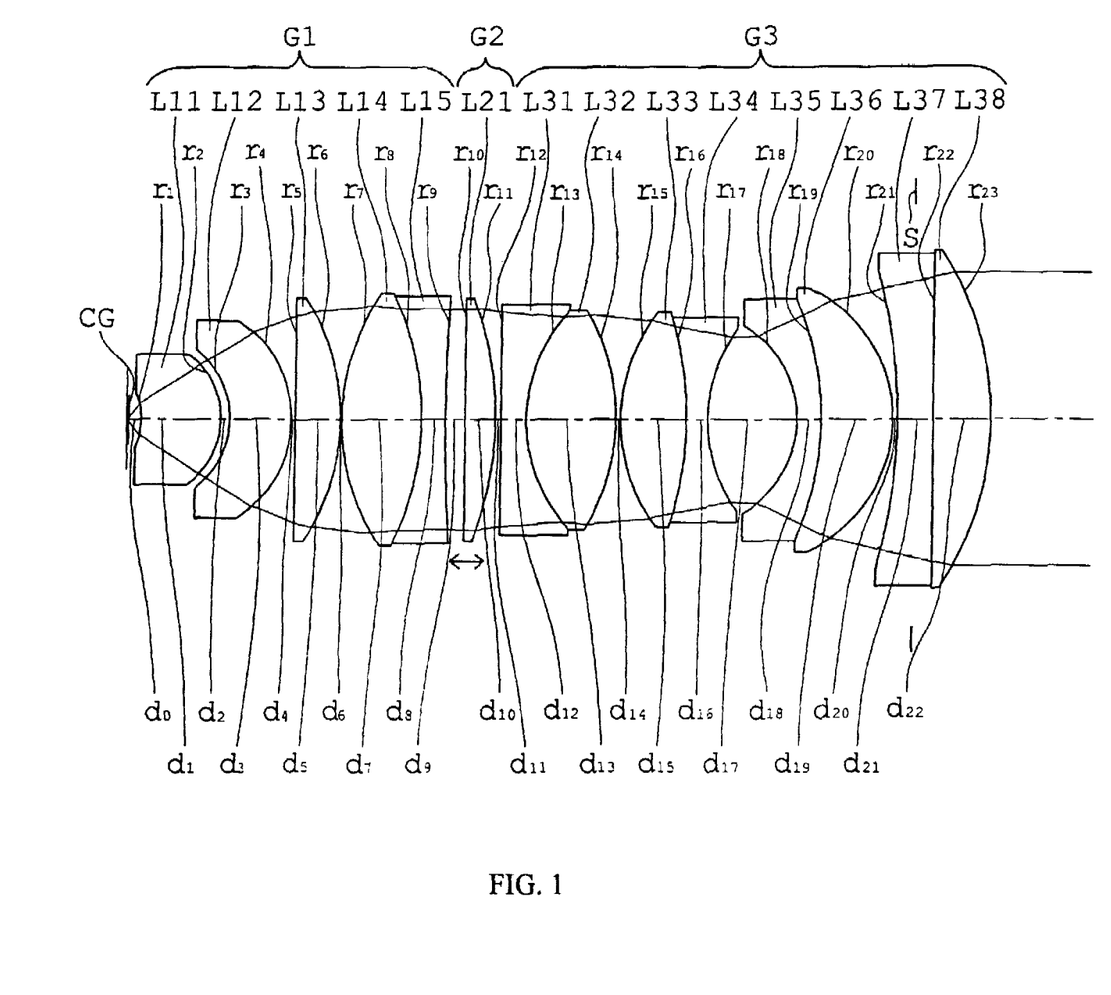
FIG. 1 is a cross-sectional view showing a cover glass CG, as well as the lens element and lens group configuration along an optical axis of a microscope objective lens according to Embodiment 1 of the present invention.

FIG. 1 is a cross-sectional view showing the lens element and lens group configuration along an optical axis of the microscope objective lens according to Embodiment 1 of the present invention. As shown in FIG. 1, the microscope objective lens of this embodiment is formed of, in order from the object side, a first lens group G1, a second lens group G2, and a third lens group G3. In addition, on the left side of the microscope objective lens shown in FIG. 1 there is a cover glass CG.

The first lens group G1 is formed of, in order from the object side, a first meniscus lens element L11 of positive refractive power with its concave surface on the object side, a second meniscus lens element L12 with its concave surface on the object side, a plano-convex lens L13 with its planar lens surface on the object side, and a cemented lens component of positive refractive power that is formed of a biconvex lens element L14 cemented to a biconcave lens element L15.

The second lens group G2 is formed of a plano-convex lens element L21 with its planar surface on the object side. Furthermore, the second lens group G2 is configured to be movable along the optical axis so as to enable correction of aberration variations associated with a change in thickness of a roughly parallel flat plate, such as a cover glass CG or a petri dish, that is arranged between an object under observation and the first lens group G1.

The third lens group G3 is formed of, in order from the object side, a cemented lens component formed of a plano-concave lens element L31 with its concave surface on the image side cemented to a biconvex lens element L32, a cemented lens component formed of a biconvex lens element L33 cemented to a biconcave lens element L34, a cemented lens component formed of a meniscus lens element L35 of negative refractive power with its convex surface on the image side cemented to a meniscus lens element L36 of positive refractive power with its concave surface on the object side, and yet another cemented lens component formed of a plano-concave lens element L37 with its planar surface on the image side cemented to a plano-convex lens element L38 with its planar surface on the object side. A pair of adjacent facing concave surfaces that are in contact with air are provided by the image-side surface of biconcave lens element L34 and the object-side surface of meniscus lens element L35.

Table 1 below lists numerical data of the optical members that comprise the microscope objective lens of Embodiment 1. In the top portion of the table are listed the cover glass thickness (in mm), the focal length f (in mm), the numerical aperture NA, and the value of β2, where β2 is the lateral magnification of the second lens group when the object of the second lens group is the image formed by the first lens group. In the middle portion of the table are listed, in order from the object side, the radius of curvature $r_i$ (for i=1-23) of each lens element surface, the on-axis spacing between lens elements di (for i=1-22), the index of refraction nd (at the d-line wavelength of 587.6 nm) of each optical element to the right of a surface i, and the Abbe number vdi of each optical element to the right of a surface i. In the bottom portion of the table is listed the on-axis distance value (in mm) from the surface of r23 to the plane S (with S being a plane where the microscope objective lens is mounted to the microscope body, with the direction from the surface of r23 toward the object being indicated by a negative value), the value of d0 (in mm), where d0 is the on-axis distance from the cover glass CG to the first lens element surface of radius of curvature r1, as well as the values of d9, d11 and D for three different thicknesses of cover glass, namely, 0.1204 mm, 0.17 mm, and 0.249 mm.

TABLE 1

Cover glass thickness: 0.17 mm
f = 18 mm
NA = 0.8
β2 = −1.11

| | | | |
|---|---|---|---|
| r1 = −7.3878 | d1 = 7.7502 | nd1 = 1.7865 | vd1 = 50 |
| r2 = −8.0452 | d2 = 0.7875 | | |
| r3 = −8.8338 | d3 = 6.1369 | nd3 = 1.603 | vd3 = 65.44 |
| r4 = −11.3001 | d4 = 0.4246 | | |
| r5 = ∞ | d5 = 4.4184 | nd5 = 1.497 | vd5 = 81.54 |
| r6 = −21.451 | d6 = 0.1139 | | |
| r7 = 21.7103 | d7 = 7.8237 | nd7 = 1.43875 | vd7 = 94.93 |
| r8 = −28.7977 | d8 = 2.4 | nd8 = 1.7725 | vd8 = 49.6 |
| r9 = 192.794 | d9 = 1.9779 | | |
| r10 = ∞ | d10 = 2.9889 | nd10 = 1.43875 | vd10 = 94.93 |
| r11 = −32.0412 | d11 = 0.4775 | | |
| r12 = ∞ | d12 = 2.3 | nd12 = 1.7725 | vd12 = 49.6 |
| r13 = 15.6187 | d13 = 8.8294 | nd13 = 1.43875 | vd13 = 94.93 |
| r14 = −21.5268 | d14 = 0.4918 | | |
| r15 = 17.755 | d15 = 6.337 | nd15 = 1.43875 | vd15 = 94.93 |
| r16 = −35.4936 | d16 = 2.1 | nd16 = 1.6134 | vd16 = 44.27 |
| r17 = 15.8401 | d17 = 8.7105 | | |
| r18 = −10.6688 | d18 = 2.4 | nd18 = 1.788 | vd18 = 47.37 |
| r19 = −28.6362 | d19 = 6.8611 | nd19 = 1.43875 | vd19 = 94.93 |
| r20 = −14.2704 | d20 = 0.5298 | | |
| r21 = −52.7292 | d21 = 3.3 | nd21 = 1.51633 | vd21 = 64.14 |
| r22 = ∞ | d22 = 5.5916 | nd22 = 1.673 | vd22 = 38.15 |
| r23 = −30.4292 | | | |

On-axis distance from the surface of r23 to the plane S equals −10 mm

| Cover glass thickness | d0 | d9 | d11 | D |
|---|---|---|---|---|
| 0.1204 mm | 1.2804 | 2.1412 | 0.3143 | 74.1516 |
| 0.17 mm | 1.248 | 1.9779 | 0.4775 | 74.1687 |
| 0.249 mm | 1.1965 | 1.7039 | 0.7516 | 74.1963 |

Figure 2A:
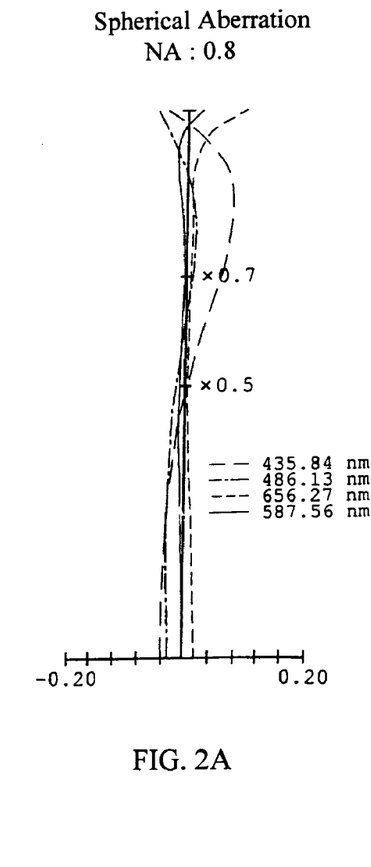
FIGS. 2A-2D show the spherical aberration, astigmatism, lateral color, and distortion, respectively, of the microscope objective lens shown in FIG. 1.
Figure 2B:
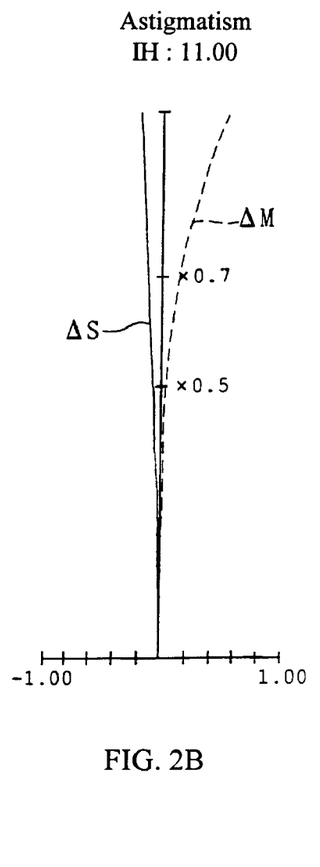
Figure 2C:
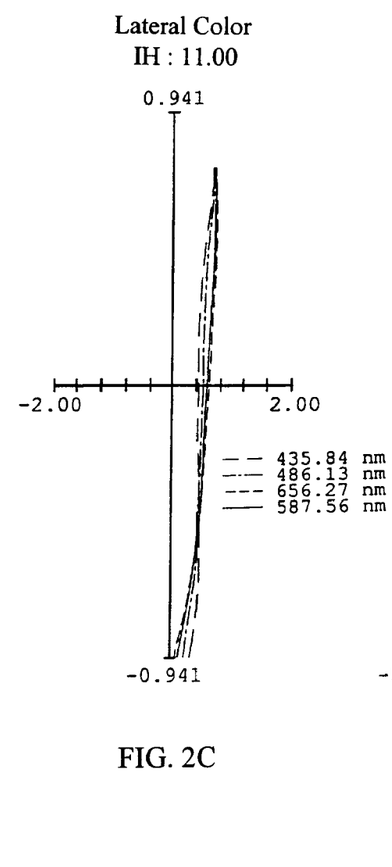
Figure 2D:
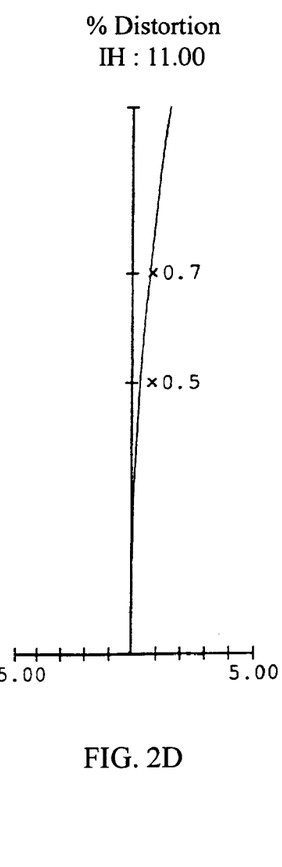

FIGS. 2A-2D show the spherical aberration (in mm), astigmatism (in mm), lateral color (in mm), and distortion (in %), respectively, of the microscope objective lens of Embodiment 1. In FIG. 2A, the label "0.8" above the ordinate indicates the maximum NA. In FIG. 2B, the astigmatism is shown for both the sagittal image surface ΔS and meridional image surface ΔM. In FIG. 2A, the ordinate position of the maximum NA (NA=0.8) times 0.5 and times 0.7 is labeled. In FIGS. 2B-2D, the label "11.00" above the ordinate indicates the maximum image height (in mm). In FIGS. 2B and 2D, the ordinate positions of the maximum image height (11.00 mm) times 0.5 and times 0.7 are shown. In FIG. 2C, the ordinate positions of maximum image height (11.00) times plus 0.941 and times minus 0.941 (as measured vertically from the optical axis) are labeled on the ordinate, and the abscissa is labeled at −2.00 mm and +2.00 mm of lateral color. In FIGS. 2A and 2C, curves are shown for the four wavelengths listed.

Embodiment 2

Figure 3:
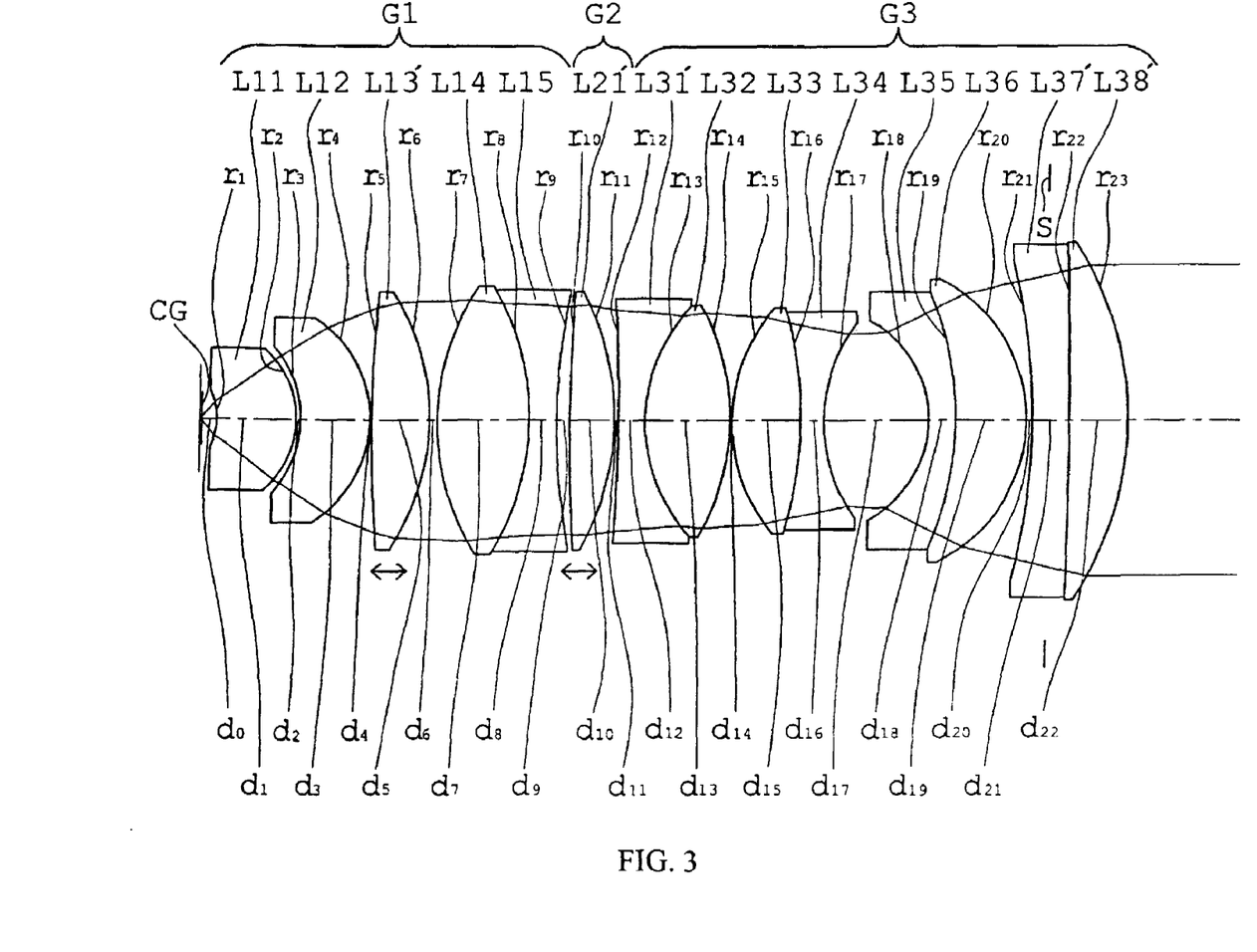
FIG. 3 is a cross-sectional view showing a cover glass CG, as well as the lens element and lens group configuration along an optical axis of a microscope objective lens according to Embodiment 2 of the present invention.

FIG. 3 is a cross-sectional view along the optical axis showing the lens element and lens group configuration of the microscope objective lens according to Embodiment 2 of the present invention. As shown in FIG. 3, the microscope objective lens of Embodiment 2 is similar to that of Embodiment 1 in that the microscope objective lens of Embodiment 2 is also formed of, in order from the object side, a first lens group G1, a second lens group G2 and a third lens group G3. Once again, CG is the cover glass. This embodiment differs from that shown in FIG. 1 primarily in that a positive lens element of the first lens group is movable along the optical axis, as shown by the double-headed arrow below lens element L13'. In addition, most of the construction values, such as given in Table 1 for Embodiment 1, are different, as will be apparent from Table 2.

The first lens group G1 is formed of a first positive meniscus lens element L11 with its concave surface on the object side, a second meniscus single lens element L12 with its concave surface on the object side, a biconvex lens element L13', and a cemented lens component having positive refractive power overall formed of a biconvex lens element L14 that is cemented to a biconcave lens element L15.

As mentioned above, the biconvex lens element L13' is movable along the optical axis so as to enable the correction of the aberration variations associated with a change in temperature of the microscope objective lens.

The second lens group G2 is formed of a biconvex lens element L21'. Further, the second lens group G2 may be moved along the optical axis (as shown by the double-headed arrow) so as to enable the correction of the aberration variations associated with the thickness of a roughly-parallel flat plate CG, such as a cover glass or a petri dish that may be arranged between an object under observation and the first lens group G1, being a non-standard value (i.e., different than the thickness of a cover glass for which the microscope was designed).

The third lens group G3 is formed of, in order from the object side, a cemented lens component formed of a biconcave lens element L31' that is cemented to a biconvex lens element L32, another cemented lens component formed of a biconvex lens element L33 that is cemented to a biconcave lens element L34, another cemented lens component formed of a negative meniscus lens element L35 with its convex surface on the image side cemented to a positive meniscus lens element L36 with its concave surface on the object side, and another cemented lens component formed of a negative meniscus lens element L37' with its convex surface on the image side cemented to a positive meniscus lens element L38' with its concave surface on the object side. A pair of adjacent concave surfaces that are in contact with air are formed by facing surfaces of the biconcave lens element L34 and the negative meniscus lens L35.

Table 2 below lists numerical data of the optical members that comprise the microscope objective lens of Embodiment 2. In the top portion of the table are listed the cover glass thickness (in mm) at room temperature, the focal length f (in mm), the numerical aperture NA, and the value of $\beta 2$, where $\beta 2$ is the lateral magnification of the second lens group when the object of the second lens group is the image formed by the first lens group. In the middle portion of the table are listed, in order from the object side, the radius of curvature $r_i$ (for i=1 to 23) of each lens element surface, the on-axis spacing between lens elements di (for i=1 to 22), the index of refraction nd (at the d-line wavelength of 587.6 nm) of each optical element to the right of a surface i, and the Abbe number νdi of each optical element to the right of a surface i. In the bottom portion of the table is listed the on-axis distance value (in mm) from the surface of r23 to the plane S (with S being a plane where the microscope objective lens is mounted to the microscope body, with the direction from the surface of r23 toward the object being indicated by a negative value), as well as the values (in mm) of d0, d4, d6, d9, d11 and D for three different thicknesses of cover glass (in mm) and two different ambient temperatures, namely, 21° C. (room temperature) and 37° C.

TABLE 2

| Cover glass thickness: 0.1757 mm at room temperature (21° C.) f = 17.95 mm NA = 0.8 $\beta 2 = -1.07$ | | | |
|---|---|---|---|
| r1 = −6.2893 | d1 = 7.435 | nd1 = 1.788 | νd1 = 47.37 |
| r2 = −8.4983 | d2 = 0.435 | | |
| r3 = −10.1532 | d3 = 6.314 | nd3 = 1.603 | νd3 = 65.44 |
| r4 = −11.3001 | d4 = 0.1634 | | |
| r5 = 123.3491 | d5 = 5.3088 | nd5 = 1.497 | νd5 = 81.54 |
| r6 = −22.1261 | d6 = 0.6147 | | |
| r7 = 22.8619 | d7 = 8.5103 | nd7 = 1.497 | νd7 = 81.54 |
| r8 = −23.4122 | d8 = 2.5 | nd8 = 1.7725 | νd8 = 49.6 |
| r9 = 58.226 | d9 = 1.2807 | | |
| r10 = 177.3687 | d10 = 4.016 | nd10 = 1.497 | νd10 = 81.54 |
| r11 = −26.1937 | d11 = 0.4724 | | |
| r12 = −154.047 | d12 = 2.4 | nd12 = 1.7725 | νd12 = 49.6 |
| r13 = 15.83 | d13 = 7.7124 | nd13 = 1.43875 | νd13 = 94.93 |
| r14 = −22.5419 | d14 = 0.1279 | | |
| r15 = 16.67 | d15 = 6.3026 | nd15 = 1.43875 | νd15 = 94.93 |
| r16 = −35.2899 | d16 = 2.1 | nd16 = 1.6134 | νd16 = 44.27 |
| r17 = 15.1661 | d17 = 9.4155 | | |
| r18 = −10.7118 | d18 = 2.503 | nd18 = 1.788 | νd18 = 47.37 |
| r19 = −28.9605 | d19 = 6.5584 | nd19 = 1.43875 | νd19 = 94.93 |
| r20 = −14.3451 | d20 = 0.5248 | | |
| r21 = −57.7601 | d21 = 3.3962 | nd21 = 1.51633 | νd21 = 64.14 |
| r22 = −486.9661 | d22 = 5.4523 | nd22 = 1.673 | νd22 = 38.15 |
| r23 = −29.6884 | | | |

On-axis distance from the surface of r23 to the mounting plane S equals −10 mm

| Ambient temperature | Cover glass Thickness | d0 | d4 | d6 | d9 | d11 | D |
|---|---|---|---|---|---|---|---|
| 21° C. | 0.1235 | 1.3975 | 0.1634 | 0.6147 | 1.408 | 0.345 | 75.0643 |
| 21° C. | 0.1757 | 1.3634 | 0.1634 | 0.6147 | 1.2807 | 0.4724 | 75.0825 |
| 21° C. | 0.254 | 1.3124 | 0.1634 | 0.6147 | 1.0746 | 0.6784 | 75.1097 |
| 37° C. | 0.1197 | 1.3883 | 0.672 | 0.12 | 1.408 | 0.345 | 75.0652 |
| 37° C. | 0.17 | 1.3552 | 0.672 | 0.12 | 1.2807 | 0.4724 | 75.0825 |
| 37° C. | 0.2497 | 1.3029 | 0.672 | 0.12 | 1.0746 | 0.6784 | 75.1098 |

Figure 4A:
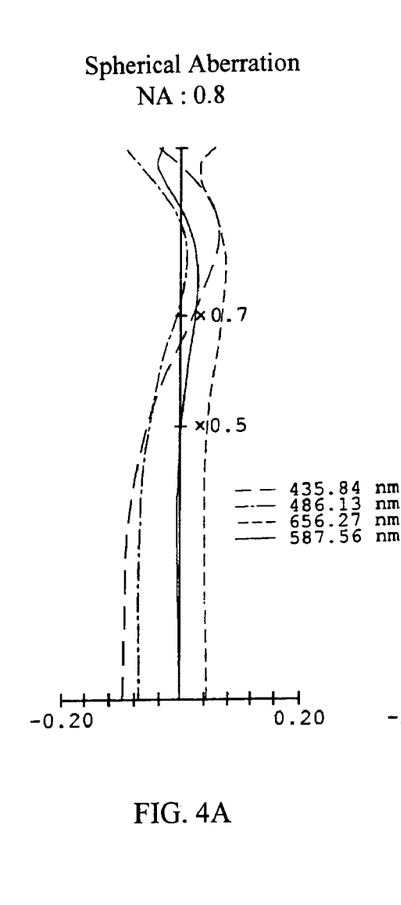
FIGS. 4A-4D show the spherical aberration, astigmatism, lateral color, and distortion, respectively, of the microscope objective lens shown in FIG. 3.
Figure 4B:
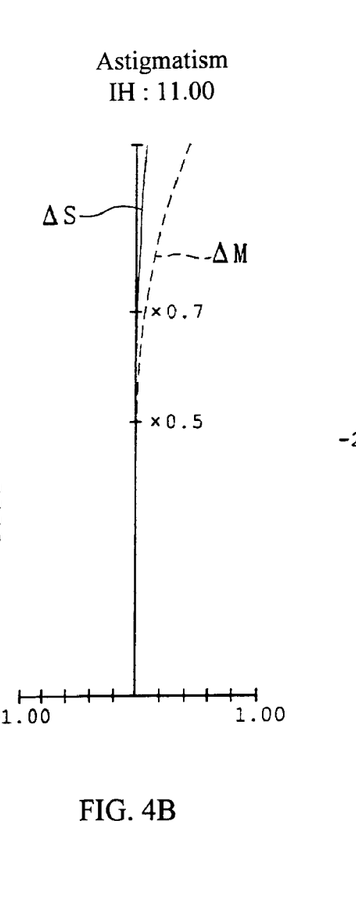
Figures 4C, 4D:
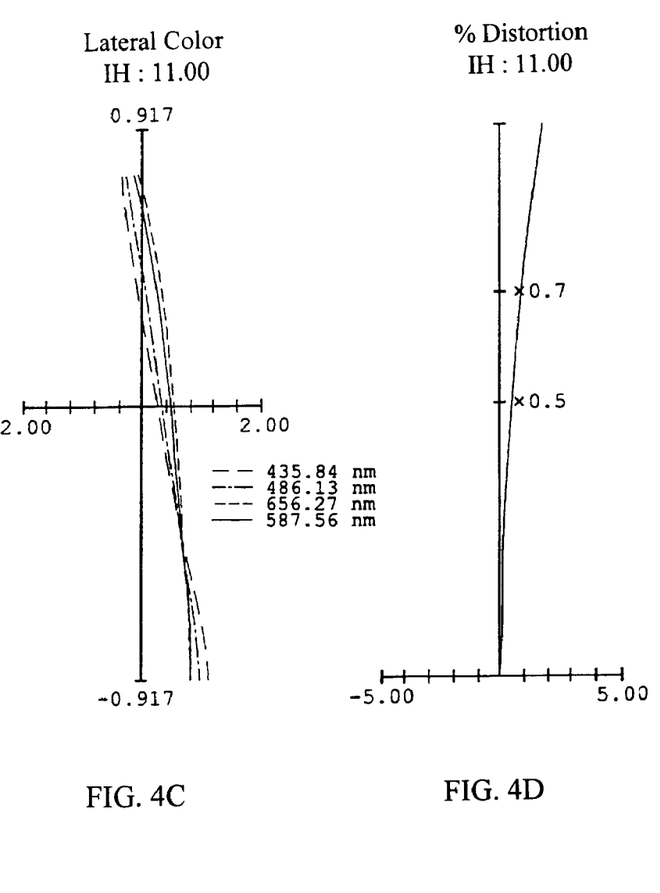

FIGS. 4A-4D show the spherical aberration (in mm), astigmatism (in mm), lateral color (in mm), and distortion (in %), respectively, of the microscope objective lens of Embodiment 2. In FIG. 4A, the label "0.8" above the ordinate indicates the maximum NA. In FIG. 4B, the astigmatism is shown for both the sagittal image surface ΔS and meridional image surface ΔM. In FIG. 4A, the ordinate position of the maximum NA (NA=0.8) times 0.5 and times 0.7 is labeled. In FIGS. 4B-4D, the label "11.00" above the ordinate indicates the maximum image height (in mm). In FIGS. 4B and 4D, the ordinate positions of the maximum image height (11.00 mm) times 0.5 and times 0.7 are shown. In FIG. 4C, the ordinate positions of maximum image height (11.00) times plus 0.917 and times minus 0.917 (as measured vertically from the optical axis) are labeled on the ordinate, and the abscissa is labeled at −2.00 mm and +2.00 mm of lateral color. In FIGS. 4A and 4C, curves are shown for the four wavelengths listed.

Figure 5:
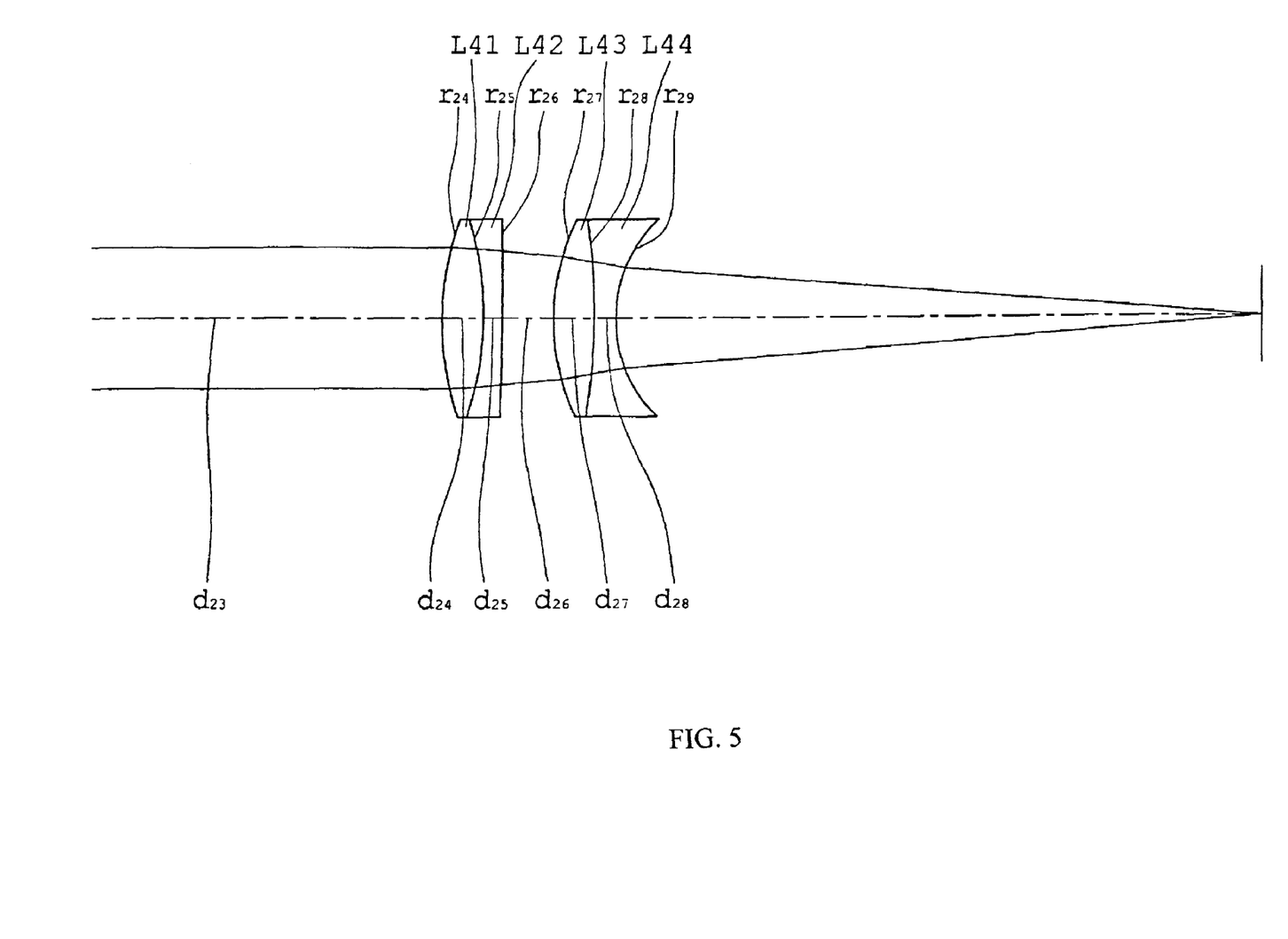
FIG. 5 is a cross-sectional view showing the lens element configuration along an optical axis of an imaging lens that may be combined with either of the microscope objective lenses shown in FIGS. 1 and 3.

FIG. 5 is a cross-sectional view of lens elements arranged along an optical axis showing the configuration of an imaging lens that may be combined with the microscope objective lens of each embodiment of the present invention. Furthermore, the imaging lens shown in FIG. 5 is commonly used with the microscope objective lens of each embodiment. As shown in FIG. 5, the imaging lens is formed of, in order from the object side, a cemented lens component formed of a biconvex lens element L41 cemented to a negative meniscus lens element L42 having its concave surface on the object side, and another cemented lens component formed of a biconvex lens element L43 cemented to a biconcave lens element L44.

Table 3 below lists the overall focal length ft1 (in mm) of the imaging lens shown in FIG. 5, as well as the numerical data of optical members that compose the imaging lens. More specifically, in the four columns of Table 3 are listed the radius of curvature of each surface of the imaging lens in order from the object side (r24 to r29), the on-axis distances (d24 to d28) between the optical surfaces, the refractive indexes (nd24 to nd28) of each optical element (at the d-line wavelength of 587.5 nm), and the Abbe numbers (vd24 to vd28) of each optical element (at the d-line wavelength of 587.6 nm) of the imaging lens.

TABLE 3 ft1 = 180 mm

| | | | |
|---|---|---|---|
| r24 = 60.4357 | d24 = 8.5 | nd24 = 1.497 | vd24 = 81.54 |
| r25 = −67.2328 | d25 = 3.8 | nd25 = 1.72047 | vd25 = 34.71 |
| r26 = −640.476 | d26 = 10.2859 | | |
| r27 = 44.0586 | d27 = 8.5 | nd27 = 1.72342 | vd27 = 37.95 |
| r28 = −113.8863 | d28 = 4.4 | nd28 = 1.6134 | vd28 = 44.27 |
| r29 = 28.0371 | | | |

Table 4 below lists values of the on-axis distance d23 (in mm), as measured from the last surface of the objective lens to the first surface of the imaging lens, at two ambient temperatures, namely 21° C. (room temperature) and 37° C.

TABLE 4

| | at 21° C. | at 37° C. |
|---|---|---|
| Value of d23 for Embodiment 1: | 80.8294 | 80.1551 |
| Value of d23 for Embodiment 2: | 79.9517 | 79.9517 |

The microscope objective lens of the present invention may be used in the medical and biological fields where it is necessary to observe weak images with a high signal-to-noise ratio despite the observation field of view being wide.

The invention being thus described, it will be obvious that the same may be varied in many ways. For example, the two embodiments discussed in detail above are intended merely as examples and are not intended to be limiting of the invention claimed, as other construction values may be selected. Moreover, a lens component may sometimes be substituted for a lens element and vice-versa. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A microscope objective lens comprising, in order from the object side:
    a first lens group having positive refractive power that includes, in order from the object side, two meniscus lens components, each with its concave surface on the object side, and at least one positive lens component;
    a second lens group having positive refractive power; and
    a third lens group having adjacent concave lens element surfaces that face each other and are in contact with air;
wherein
    said second lens group is movable along the optical axis, and
    the following conditions are satisfied:

$7 \leq f$ $0.5 < NA$ where
    f is the focal length (in mm) of the microscope objective lens, and
    NA is the numerical aperture on the object side of the microscope objective lens.

2. The microscope objective lens of claim 1, wherein the movement of the second lens group along the optical axis is for the correction of aberration variations associated with a non-standard thickness of a roughly-parallel flat plate that may be arranged between an object under observation and the first lens group.

3. A microscope objective lens comprising, in order from the object side:
- a first lens group having positive refractive power that includes, in order from the object side, two meniscus lens components, each with its concave surface on the object side, and at least one positive lens component;
- a second lens group having positive refractive power; and
- a third lens group having adjacent concave lens element surfaces that face each other and are in contact with air;

wherein
- the second lens group is movable along the optical axis for correction of aberration variations associated with a non-standard thickness of a roughly-parallel flat plate that may be arranged between an object under observation and the first lens group and satisfies the following condition:

$$0.8 \leq |\beta 2| \leq 1.2$$

where
- $\beta 2$ is the lateral magnification of the second lens group when the object of the second lens group is the image formed by the first lens group; and
- the following additional conditions are satisfied:

$$7 \leq f$$

$$0.5 < NA$$

where
- f is the focal length (in mm) of the microscope objective lens, and
- NA is the numerical aperture on the object side of the microscope objective lens.

4. A microscope objective lens comprising, in order from the object side:
- a first lens group having positive refractive power that includes, in order from the object side, two meniscus lens components, each with its concave surface on the object side, and at least one positive lens component;
- a second lens group having positive refractive power; and
- a third lens group having adjacent concave lens element surfaces that face each other and are in contact with air;

wherein
- a positive lens component in the first lens group that is on the image side of said two meniscus lens components in the first lens group is movable along the optical axis so as to enable the correction of aberration variations associated with a change in temperature of said microscope objective lens.

5. The microscope objective lens of claim 4, wherein the following conditions are satisfied:

$$7 \leq f$$

$$0.5 < NA$$

where
- f is the focal length (in mm) of the microscope objective lens, and
- NA is the numerical aperture on the object side of the microscope objective lens.

6. The microscope objective lens of claim 5, wherein the second lens group is movable along the optical axis for correction of aberration variations associated with a non-standard thickness of a roughly-parallel flat plate that may be arranged between an object under observation and the first lens group.

7. The microscope objective lens of claim 6, wherein the second lens group satisfies the following condition:

$$0.8 \leq |\beta 2| \leq 1.2$$

where
- $\beta 2$ is the lateral magnification of the second lens group when the object of the second lens group is the image formed by the first lens group.

8. A microscope objective lens comprising, in order from the object side:
- a first lens group having positive refractive power that includes, in order from the object side, two meniscus lens components, each with its concave surface on the object side, and at least one positive lens component;
- a second lens group having positive refractive power; and
- a third lens group having adjacent concave lens element surfaces that face each other and are in contact with air;

wherein
- the second lens group is movable along the optical axis for correction of aberration variations associated with a non-standard thickness of a roughly-parallel flat plate that may be arranged between an object under observation and the first lens group; and
- the following condition is satisfied:

$$60 < D \leq 120$$

where
- D is the on-axis distance (in mm) from an object under observation to a plane where said objective lens is mounted to the microscope body; and
- the following additional conditions are satisfied:

$$7 \leq f$$

$$0.5 < NA$$

where
- f is the focal length (in mm) of the microscope objective lens, and
- NA is the numerical aperture on the object side of the microscope objective lens.

9. The microscope objective lens of claim 8, wherein the following additional condition is satisfied:

$$0.8 \leq |\beta 2| \leq 1.2$$

where
- $\beta 2$ is the lateral magnification of the second lens group when the object of the second lens group is the image formed by the first lens group.

10. The microscope objective lens of claim 9, wherein a positive lens component in the first lens group that is on the image side of said two meniscus lens components in the first lens group is movable along the optical axis so as to enable the correction of aberration variations associated with a change in temperature of said microscope objective lens.

* * * * *